INVENTOR.
KARL I. GRAHAM
BY
ATTORNEYS

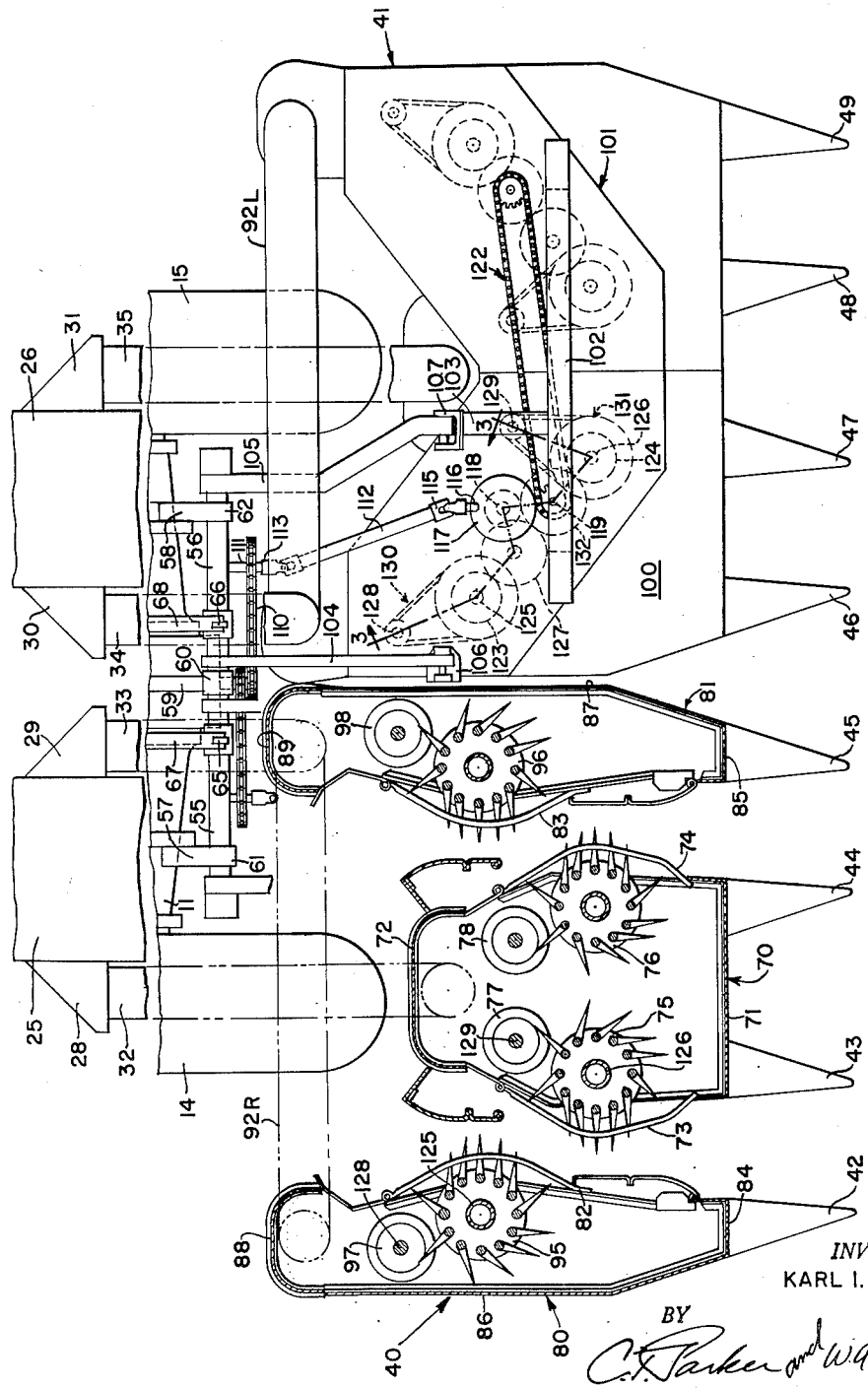

United States Patent Office 3,031,828
Patented May 1, 1962

3,031,828
COTTON HARVESTER
Karl I. Graham, Des Moines, Iowa, assignor to Deere & Company, Moline, Ill., a corporation of Delaware
Filed Feb. 15, 1960, Ser. No. 8,811
10 Claims. (Cl. 56—14)

This invention relates to a cotton harvester and more particularly to the arrangement of the various elements composing the cotton harvester in relation to the main supporting frame of the harvester.

Conventionally the main supporting structure for a cotton harvester is composed of an elongated main frame supported by a pair of forwardly positioned and transversely spaced apart traction wheels which run outside of a pair of adjacent and parallel rows of cotton plants. Cotton harvesting mechanism is generally positioned between the traction wheels and extends forwardly from the main frame to harvest cotton from the pair of rows. The harvesting units are composed of housing structure which form fore-and-aft extending plant passageways for receiving the respective rows as the harvester advances. Supported in the housing structure are picking elements which extend laterally into the passageways to pick the cotton from the plants. Also provided in the housing structures are cotton removing means, usually in the form of doffing mechanisms and a suction type discharge conveyor, which operates to remove cotton from the cotton picking elements and the housing structure and convey the cotton to a suitable receptacle. It has been conventional in the past to provide picking mechanism for simultaneously picking two rows of cotton which is generally contained between the inner faces of the transversely spaced wheels.

It is the purpose of the present invention to provide a cotton harvester which will simultaneously pick cotton from four adjacent rows of cotton, two rows of which are between the inner faces of the wheels and two of which are outwardly of the outer faces of the wheel. Since the harvesting units project forwardly of the axle structure there exists the potential problem of over-balancing of the forward end of the harvester as the additional harvesting mechanisms are added. Consequently it is necessary and it is the purpose of the present invention to provide new and novel arrangement of the picking elements and cotton boll removing mechanism which permits the entire cotton harvester to be positioned relatively close to the axle structure while at the same time completely utilizing the space forwardly of the wheels.

More specifically it is the purpose of the present invention to incorporate in the cotton harvester, housing structure which is formed about the transversely spaced traction wheels and which is composed of a pair of U-shaped vertically disposed housings with the bight portion of each U-shaped housing disposed forwardly of and adjacent the respective wheels, and the leg portions of each housing extending rearwardly and bracing from opposite sides the respective traction wheels. Each housing is composed of a compartment or casing which is positioned closely adjacent the forward periphery of a wheel and has transversely alined picking elements which contact the pair of rows on opposite sides of the wheel and from the wheel side of the respective rows. The housing further includes a pair of fore-and-aft extending compartments or casings which are positioned on the opposite side of the aforesaid rows and have picking elements extending into the rows from the side of the plants away from the wheels. The picking elements in the latter compartments are transversely alined and are considerably rearwardly of the picking elements of the forwardly disposed compartment. Also, in the latter compartments there are provided cotton removing means which are disposed in rearward extensions of the compartments and in transverse alined disposition to the inner and outer faces of the respective wheel.

It is a further purpose of the present invention to incorporate in the afore-described cotton harvester means for raising or lowering the pair of the housing structures, either separately or in unison.

It is still a further object of the present invention to incorporate in the afore-described harvesting mechanism a unique arrangement of suction conveyor means.

Other objects and advantages of the present invention will become apparent to those skilled in the art as the nature of the invention is better understood from the following description and as shown in the accompanying drawings.

FIG. 2 is a plan view of the harvester shown in FIG. 1 with parts thereof shown in section.

Figure 1:
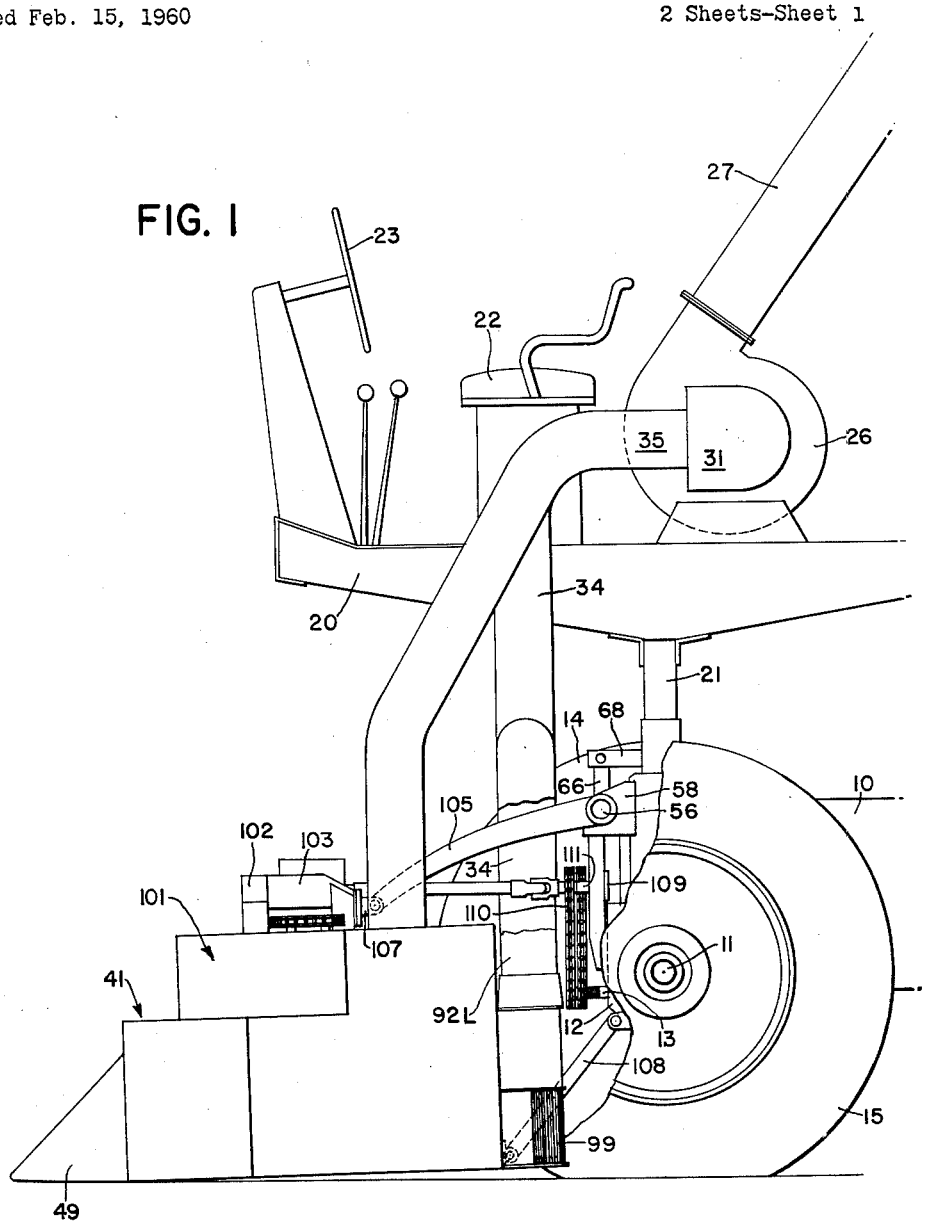
FIG. 1 is a side view with portions broken away of the cotton harvesting mechanism with only the front portion of the mobile carrying vehicle shown.

Referring now to FIG. 1, there is provided a main mobile frame composed of a fore-and-aft extending elongated body 10 supported at its forward end by transverse axle structure 11 which includes a centrally located differential drive 12 having a forwardly extending power take-off shaft 13. The transverse axle structure 11 has right-and left-hand carrying or traction wheels 14, 15 respectively at opposite ends thereof to carry the machine forwardly over the row-planted field with the longitudinal center line of the main frame or body 10 being centered between a pair of adjacent inner right- and left-hand rows. As will become later apparent, the wheels 14, 15 and the transverse axle structure 11 forms a space just rearwardly of the axle structure 11 which accommodates part of the cotton harvesting mechanism. The right- and left-hand wheels 14, 15 are also disposed to run between pairs of rows to the right and left respectively of the fore-and-aft center line of the tractor or main frame 10. Consequently relative to each of the wheels 14, 15 there will be a row of plants closely adjacent to its inner face and closely adjacent to its outer face.

The main frame or body 10 supports a platform 20 by means of upright structure indicated generally at 21, the lower end of which is mounted directly over the axle structure 11. The platform 20 carries an operator's station, here indicated by the seat 22, which faces steering mechanism 23. Other control levers and mechanism for the harvester are positioned adjacent the operator's station. The tractor or mobile frame has an hydraulic system of the conventional type which may be utilized for various functions such as power raising and lowering the harvesting mechanism.

Supported on the platform 20 rearwardly of the seat 22 are a pair of transversely alined and transversely spaced apart blower housings 25, 26 respectively. The blower housings 25, 26 are provided with discharge ducts, as is shown at 27, which operate to blow cotton into a receptacle, not shown. Each of the blower housings is disposed on opposite sides of the fore-and-aft centerline of the tractor body and have oppositely disposed inlets 28, 29, and 30, 31 which face forwardly to receive suction ducts 32, 33, 34 and 35.

A pair of transverse housing structures, here indicated in their entirety by the reference numerals 40, 41, is disposed on opposite sides of the fore-and-aft extending center line of the main body 10. The right-hand housing structure is provided with forwardly extending gathering structure or points 42, 43, and 44, 45 which define forwardly directed gathering throats which receive the right-hand pair of rows of plants and specifically the rows outwardly of and inwardly of the right-hand wheel 14. Similarly the left-hand housing structure 41 has forwardly directed gathering points 46, 47 and 48, 49 which extend forwardly to define throats which receive the left-hand pair of rows of plants adjacent to and inwardly and outwardly respectively of the left-hand wheel 15.

The housing structures 40, 41 are supported on the main frame by means of a pair of transversely alined rockshafts 55, 56 which are rockably supported on the axle structure 11 by means of forwardly directed brackets 57, 58 fixed to the axle structure 11. The adjacent ends of the shafts 55, 56 are supported on a forwardly directed bracket 59 centrally located between the wheels 14, 15 which carries a journal 60 for supporting the inner ends of the rockshafts 55, 56. As may be seen from viewing FIG. 2, the brackets 57, 58 support forwardly positioned journal elements 61, 62 which carry the outer ends of the respective rockshafts 55, 56. The exact method of attachment of the rockshafts 55, 56 is not important for purposes of fully appreciating the present invention other than to recognize, that the rockshafts 55, 56 are independently supported and may be rocked independently of one another. Fixed to the rockshafts 55, 56 are upwardly projecting arms 65, 66 respectively connected at their upper ends to rearwardly projecting links 67, 68. The links 67, 68 are connected to the hydraulic power source on the vehicle and consequently operate to rock the shafts 55, 56.

The housing structures 40, 41 are identical as well as the harvesting mechanism contained therein. Consequently description of the housing structures as well as the harvesting mechanism will be limited only to that on one side of the harvester. The housing structure 40 includes a forwardly disposed compartment 70 longitudinally forward of the wheel 14 and having a front wall 71, a rear wall structure 72, and oppositely disposed sides 73, 74 which face the rows of plants on opposite sides of the wheel 14. The rear wall 72 is of at least partially grilled construction so as to permit air from the outside to pass directly into the housing compartment 70. Transversely alined picking elements here indicated by the reference numerals 75, 76 respectively are positioned adjacent the sides 73, 74 and in the forward area of the compartment 70. The picking elements 75, 76 are of the conventional picking drum type with lateral spindles extending into the plant rows which operate to detach the ripe cotton bolls from the plants. Positioned rearwardly of the picking drums 75, 76 are a pair of doffing mechanisms 77, 78 also of conventional construction, which removes the cotton bolls from the spindles of the picking drums 75, 76 and drives them in a rearward direction toward the rear wall 72. The suction duct 32 is formed to pass over the wheel 14 and extend into the rear portion of the compartment 70 and to suck the bolls upwardly into the conveying system.

The housing structure 40 is of such transverse dimension so as to extend laterally beyond the rows of plants on opposite sides to the wheel 14 and includes longitudinal inner and outer side compartments 80, 81 respectively laterally beyond the respective rows. The inner and outer side compartments 80, 81 are identical to one another and have longitudinal sides 82, 83 respectively facing the rows of plants on the opposite sides of and in opposed relation to the aforesaid sides 73, 74 on the compartment 70. The sides 73, 82 and 74, 83 define plant passageways continuing rearwardly from the plant receiving throats formed by the gathering points 42, 43 and 44, 45 respectively. The outer compartments 80, 81 are further characterized by relatively narrow upright front walls 84, 85 and longitudinal extending walls 86, 87 extending from the upright edges of the front walls 84, 85 to the outer edges of rear transverse walls 88, 89. Referring to FIG. 2, it will be noted that the inner and outer compartments 80, 81 have rearward extensions rearwardly of the forward extremity of the wheel 14 and that the rear portion or extension of the inner compartment 81 extends to a position rather closely adjacent to the axle structure 11 and within the confines of the accommodation space defined by the inner faces of the wheels 14, 15 and the transverse axle structure 11.

Transversely alined cotton picking drums or elements 95, 96 are located respectively in the outer and inner side compartments 80, 81 and are offset to the rear of the picking elements 75, 76 in the forwardly disposed compartment 70. The picking drums 95, 96 are also of conventional nature and have laterally extending picking spindles which extend into the row of plants adjacent the respective compartments to remove cotton bolls from the plants. Doffing drums 97, 98, which may be considered as part of the cotton removing means, are positioned rearwardly of the drums 95, 96 and operate to remove the cotton from the spindles of those drums. The cotton removing means also includes the openings for receiving the downwardly opening inlets of the suction duct systems. It should here be noted that the rear walls 88, 89 are at least partially grilled at their lower portion as indicated at 99 in FIG. 1 to receive relatively clean air into the area of the compartments 80, 81 adjacent the suction ducts 32, 33. The suction duct system may best be described as including first suction ducts 92R for the right unit 40, and 92L for the left unit 41, which are L-shaped and have vertical portions opening downwardly into the outer side compartments and a transverse horizontal portion extending over the respective wheels 14, 15 and joined with the suction ducts 33, 34 above the wheel 14 and prior to discharge of material from the ducts 33, 34 into the respective blower inlets 29, 30. The ducts 33, 34 extend directly into the inner side compartment of the housing structures 40, 41. The arrangement of the latter duct system can best be seen in FIG. 1 which shows the duct system for the left-hand housing structure 41.

The compartments 70, 80, and 81 are all rigidly held together by an overhead plate as indicated at 100 on the left unit 40, which extends above the passageways and generally closes the compartments 70, 80 and 81 from above, and also by laterally disposed housing structure 101 which extends across the top of the housing structure 41 and serves to generally cover or close the drive mechanism for the harvesting mechanism. Further provided for transverse structural strength is a transverse brace or beam 102 which is fixed at opposite ends to the drive housing 101. A fore-and-aft extending beam 103 extends rearwardly from the brace beam 102 and is connected at its rearward end to the top plate of the housing 101. The beam 103 is positioned above the housing 101 for purposes of permitting a chain drive, later to be explained to pass over the housing 101. The housing structures 40, 41 are mounted on their respective rockshafts 55, 56 by similar means and as herein described relative to the left-hand housing structure 41. Extending forwardly from the rockshaft 56 are a pair of lift-arms 104, 105 which are connected at their forward ends by suitable brackets 106, 107 fixed to the drive housing 101. The lift-arm 105 is formed to fit around the forward inner extremity of the wheel 15. As may be readily evident from viewing FIGS. 1 and 2, the housing structure 41 may be raised and lowered by moving the link 68 forwardly or rearwardly. Stabilizing links such as at 108 extend from the lower portions of the housing structures 40, 41 to the axle housing structure 11.

Figure 3:
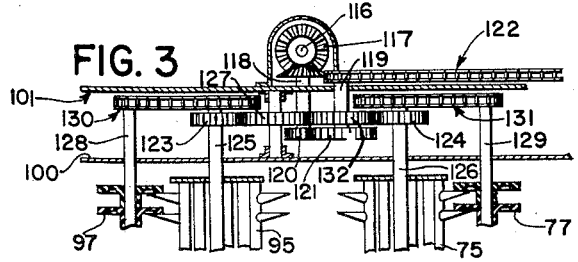
FIG. 3 is a schematic view of the drive mechanism as taken substantially along the lines 3—3 of FIG. 2.

The power for operating the harvesting mechanisms in the housing units 40, 41 are also identical and description will be limited to the left unit 41. The power is received directly from the power take-off shaft 13 and initially includes a chain and sprocket drive 110 which extends outwardly and upwardly to an intermediate drive shaft 111 which projects forwardly and is supported on the axle structure 11 by suitable means, not shown in detail but indicated partially at 109 in FIG. 1. A forwardly extending shaft 112 is connected by universal joints 113, 115 at opposite ends to the intermediate drive shaft 111 and a short stub shaft 116 which extends into a bevel gear transmission 117 which in turn operates a vertical drive shaft 118 projecting downwardly through the top plate of the drive housing 101. A vertical counter shaft 119 projects upwardly through the top plate of the drive housing 100 and drives a chain and sprocket drive 122 which extends outwardly to drive the harvesting mechanisms adjacent and on opposite sides of the outer row of plants. Since the drive arrangement for the harvesting mechanism for all four rows are identical the drive mechanism for only a singel row is shown in detail in FIG. 3. Likewise, since the drive mechanism for operating the harvesting mechanism in both the housing structures 40, 41 are identical, description will be limited only to that in the left-hand housing structure 41.

The counter shaft 119 also carries a pinion 132 which meshes with gear 124 fixed to the picking drum shaft 126. A reversing gear 127 is positioned between and meshes with gears 132 and 123, the latter being fixed to drum shaft 125. The shafts 125, 126 operate the picking drums 95, 75 on opposite sides of the rows. Extending from the upper end of the drum shafts 125, 126 and extending rearwardly to respective doffing drum shafts 128, 129, which operate the doffing mechanisms 97, 77, respectively, are chain and sprocket drives 130, 131 respectively.

Reviewing the entire structure as a whole, it becomes apparent that the harvesting mechanism for all four rows will be driven from the single power take-off shaft 13 and will operate in unison. Also, the housing structures 40, 41 and their associated harvesting mechanism may be raised and lowered independently of one another so that either pair of rows on opposite sides of the fore-and-aft center line of the harvester may be raised to transport position or otherwise become ineffective for harvesting while the opposite housing structure and its associated harvesting mechanism may continue to harvest its pair of rows. It should also be noted that by providing the harvesting mechanisms 95, 96 in the side compartments 80, 81 to be positioned rearwardly of the harvesting mechanisms 75, 76 in the forwardly disposed compartment 70, the entire harvester may be moved closely adjacent the axle structure 11 since the rearward extensions of the side compartments 80, 81 may fit around or embrace the forward periphery of the wheels 14, 15.

While only one form of the invention has been shown, it should be recognized that other forms and variations will occur to those skilled in the art. Therefore, while the present disclosure was shown and described in detail for purposes of fully and concisely illustrating the principles of the invention, it should be understood that such was for purposes of disclosure and was not intended to limit or narrow the invention beyond the broad concepts set forth in the appended claims.

What is claimed is:

1. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being co-axially spaced apart so as to run between the rows of each of the respective right- and left-hand pair of rows, and the relationship between said wheels and axle being such as to define a forwardly opening accommodation space ahead of the axle, said attachment comprising: a pair of transverse housing structures having means for the mounting thereof on the frame ahead of the wheels and axle on opposite sides of the longitudinal centerline and each provided with a pair of parallel plant-receiving throats arranged on opposite sides of the respective wheel whereby the throats will receive the plants of a row outward of the wheel and inward of the wheel respectively; each of said structures including a forwardly disposed compartment longitudinally forward of the respective wheel and having opposite longitudinal sides facing the rows of plants from the wheel-side of the plants; each of said structures further being of such transverse dimension as to extend laterally beyond the rows of plants on opposite sides of the respective wheel and having longitudinal inner and outer side compartments laterally beyond the respective rows, the structure of the latter compartments including longitudinal sides facing the plants and in opposed relation to the aforesaid longitudinal sides on the wheel-side of the plants, said longitudinal sides thereby defining fore-and-aft extending plant passageways continuing rearwardly from the throats, said side compartments having transversely alined rear portions rearwardly of the forward extremities of the wheels with the rear portions of the inner side compartments being disposed within the accommodation space; transversely alined picking elements located respectively in each of the forwardly disposed compartments extendable outwardly of said oppositely disposed longitudinal sides and operative to pick cotton simultaneously from the wheel-sides of the plants; structure defining cotton removing means located rearwardly respectively of the picking elements in the forwardly disposed compartments effective to remove cotton from the forwardly disposed compartments; transversely alined picking elements located respectively in the inner and outer side compartments and offset to the rear of the picking elements in the forwardly disposed compartments but positionable ahead of the axle structure and operative to pick cotton simultaneously from the sides of plants away from the wheels; and structure defining cotton removing means located respectively in said rear portions on opposite sides of the wheels for removing cotton respectively from the inner and outer side compartments.

2. The invention defined in claim 1 in which the picking attachment is further characterized by a suction type conveying system comprising a pair of transversely alined fans, each having a pair of suction inlets, a suction duct means including a duct extending from each of the forwardly disposed compartments adjacent their cotton removing means to one of the inlets on each of the fans, and a pair of ducts extending from the respective inner and outer side compartments of each housing structure, each pair being joined together above said side compartments into single ducts extending to the other inlets of said pair of fans.

3. The invention defined in claim 1 in which the picking attachment is further characterized by a suction conveying system having duct means with intake ends opening into the forwardly disposed compartments and inner and outer side compartments respectively and further characterized by said compartments having grilled wall structure adjacent the intake ends of said suction duct means for effecting passage of air from outside of the compartments into the suction ducts.

4. The invention defined in claim 1 in which the means for mounting the housing structures on the frame includes therein transverse rockable means rigid with and rearwardly of the housing structure by which independent vertical motion of the housing structures may be effected; and further characterized by separate hydraulic means between said frame and the structures for independently adjusting the vertical positions of the housing structures.

5. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between the rows of each of the right- and left-hand pair of rows respectively, and the relationship between said wheels and axle being such as to define a forwardly opening accommodation space ahead of the axle, said attachment comprising: a pair of transverse housing structures having means for the mounting thereof on the frame ahead of the respective wheels and on opposite sides of the longitudinal centerline and each provided with a pair of parallel plant-receiving throats arranged on opposite sides of the respective wheel whereby the throats will receive the plants of a row outward of the wheel and inward of the wheel respectively; each of said structures including a forwardly disposed compartment longitudinally forward of the respective wheel and having opposite longitudinal sides facing the rows of plants from the wheel-side of the plants, each of said structures further including inner and outer side compartments laterally beyond the respective rows and having longitudinal sides facing the plants in opposed relation to the aforesaid longitudinal sides on the wheel-side of the plants, said longitudinal sides thereby defining fore-and-aft extending plant passageways continuing rearwardly from the throats, and said side compartments having transversely alined rear portions rearwardly of the forward extremities of the wheels with the rear portions of the inner side compartments being disposed within the accommodation space; transversely alined picking elements located respectively in each of the forwardly disposed compartments extendable outwardly of said oppositely disposed longitudinal sides and operative to pick cotton simultaneously from the wheel-sides of the plants; structure defining cotton removing means located rearwardly respectively of the picking elements in the forwardly disposed compartments effective to remove cotton from the forwardly disposed compartments; transversely alined picking elements located respectively in the inner and outer side compartments and offset to the rear of the picking elements in the forwardly disposed compartments but positionable ahead of the axle structure and operative to pick cotton simultaneously from the sides of plants away from the wheels; and structure defining cotton removing means located respectively in said rear portions on opposite sides of the wheels for removing cotton respectively from the inner and outer side compartments.

6. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between the rows of each of the right- and left-hand pair of rows respectively, a pair of transverse housing structures having means for the mounting thereof on the frame ahead of the wheels and axle on opposite sides of the longitudinal centerline and each provided with a pair of parallel-plant-receiving throats arranged on opposite sides of the respective wheel whereby the throats will receive the plants of a row outward of the wheel and inward of the wheel respectively; each of said structures including a forwardly disposed compartment longitudinally forward of the respective wheel and between the rows of plants on opposite sides of the respective wheel and having longitudinal side compartments laterally beyond the pair of rows on opposite sides of the respective wheel, said longitudinal side compartments being transversely spaced from the forwardly disposed compartment to define therewith fore-and-aft extending plant passageways continuing rearwardly from the throats, said side compartments having transversely alined rear portions rearwardly of the forward extremity of the respective wheel with the rear portions being disposed relatively close to the axle; and harvesting mechanism located respectively in each of the compartments operative to pick cotton simultaneously from the rows of plants with the harvesting mechanism in the side compartments offset to the rear of the harvesting mechanism in the forwardly disposed compartments.

7. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between the rows of each of the right- and left-hand pair of rows respectively, and the relationship between said wheels and axle being such as to define a forwardly opening accommodation space ahead of the axle, said attachment comprising: housing structure having means for the mounting thereof on the frame ahead of the wheels and axle; said housing structures including a pair of forwardly disposed compartments longitudinally forward of the wheels and having opposite longitudinal sides facing the rows of plants from the wheel-side of the plants; said housing structure further being of such transverse dimension as to extend laterally beyond the rows of plants outwardly of the wheels and having longitudinal outer compartments laterally beyond the rows and further having longitudinal sides facing the plants in opposed relation to the aforesaid longitudinal sides on the wheel-side of the plants, said longitudinal sides thereby defining outer fore-and-aft extending plant passageways; said housing structure further having central compartment means with the rear portion thereof being disposed within the accommodation space and having oppositely disposed longitudinal sides facing the plants of the rows next adjacent the centerline and in opposed relation to the inner sides of the structure of the forwardly disposed compartments to define with the latter fore-and-aft extending passageways receiving the rows of plants next adjacent and on opposite sides of the centerline; harvesting mechanism located respectively in each of the forwardly disposed compartments extendable outwardly of said oppositely disposed longitudinal sides and operative to pick cotton simultaneously from the wheel sides of the plants; and transversely alined harvesting mechanism located respectively in the outer side compartments and central compartment means offset to the rear of the harvesting mechanism in the forwardly disposed compartments operative to pick cotton simultaneously from the sides of plants away from the wheels.

8. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between the rows of each of the right- and left-hand pair of rows respectively, and the relationship between said wheels and axle being such as to define a forwardly opening accommodation space ahead of the axle, said attachment comprising: a pair of blowers supported on the frame on opposite sides of the centerline, each of the blowers having a pair of inlets and a discharge duct; housing structure having means for the mounting thereof on the frame ahead of the wheels and axle; said housing structures including a pair of forwardly disposed compartments longitudinally forward of the wheels and having opposite longitudinal sides facing the rows of plants from the wheel side of the plants; said housing structure further being of such transverse dimension as to extend laterally beyond the rows of plants outwardly of the wheels and having longitudinal outer compartments laterally beyond the rows and longitudinal sides facing the plants and in opposed relation to the aforesaid longitudinal sides on the wheel-side of the plants, said longitudinal sides thereby defining outer fore-and-aft extending plant passageways; said housing structure further having central compartment means adjacent the longitudinal centerline with the rear portion thereof being disposed within the accommodation space and having oppositely disposed longitudinal sides facing the plants of the rows next adjacent the centerline and in opposed relation to the inner sides of the forwardly disposed compartments to define with the latter fore-and-aft extending passageways receiving the rows of plants next adjacent and on opposite sides of the centerline; harvesting mechanism located respectively in each of the forwardly disposed compartments extendable outwardly of said oppositely disposed longitudinal sides and operative to pick cotton simultaneously from the wheel sides of the plants; and transversely alined harvesting mechanism located respectively in the outer side compartments and central compartment means offset to the rear of the harvester mechanism in the forwardly disposed compartments operative to pick cotton simultaneously from the sides of plants away from the wheels; and suction ducts extending upwardly from each of the outer compartments rearwardly of the forward extremities of the wheels; a pair of ducts extending upwardly from the central compartment means, one each of said pair of ducts and one each of said suction ducts being joined above a respective wheel into a single duct feeding to one of the inlets on each of the pair of blowers; and suction ducts extending from the respective forwardly disposed compartment rearwardly and longitudinally above the respective adjacent wheel to the other of the inlets on each of the pair of blowers.

9. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between the rows of each of the right- and left-hand pair of rows respectively, and the relationship between said wheels and axle being such as to define a forwardly opening accommodation space ahead of the axle, said attachment comprising: housing structure having means for the mounting thereof on the frame ahead of the wheels and axle; said housing structures including a pair of forwardly disposed compartments longitudinally forward of the wheels and having opposite longitudinal sides facing the rows of plants from the wheel-side of the plants; said housing structure further being of such transverse dimension as to extend laterally beyond the rows of plants outwardly of the wheels and having longitudinal outer compartments laterally beyond the rows and longitudinal sides facing the plants in opposed relation to the aforesaid longitudinal sides on the wheel-side of the plants, said longitudinal sides thereby defining outer fore-and-aft extending plant passageways, said housing structure further having central compartment means with the rear portion thereof being disposed within the accommodation space and having oppositely disposed longitudinal sides facing the plants of the rows next adjacent the centerline and in opposed relation to the inner sides of the forwardly disposed compartments to define with the latter fore-and-aft extending passageways receiving the rows of plants next adjacent and on opposite sides of the centerline; harvesting mechanism located respectively in each of the forwardly disposed compartments and outer compartments operative to pick cotton simultaneously from the plants moving through the passageways on opposite sides of the forwardly disposed compartments and transversely alined harvesting mechanism located respectively in the central compartment means offset to the rear of the harvesting mechanism in the forwardly disposed compartments operative to pick cotton simultaneously from the plants adjacent the centerline.

10. A cotton-picking attachment for use with a vehicle in a field in which cotton is planted in conventional parallel rows spaced uniformly apart, wherein such vehicle has a longitudinal mobile frame including a transverse axle and right- and left-hand carrying wheels respectively at opposite ends of the axle to carry the machine forwardly over the field with the longitudinal centerline of the frame centered between adjacent right- and left-hand pair of rows, said right- and left-hand wheels being coaxially spaced apart so as to run between rows inwardly of and rows outwardly of the respective wheels, and the relationship between said wheels and axle being such as to define a forwardly opening accommodation space ahead of the axle, said attachment comprising: housing structure mounted on the frame, part of which is mounted ahead of the axle structure within the confines of the accommodation space and defines a pair of parallel plant-receiving passageways arranged on opposite sides of the centerline whereby the throats will receive the plants of the rows inwardly of the wheels, and parts thereof outwardly of both of the wheels defining fore-and-aft passageways receiving the plants of the rows outwardly of the wheels; and picking elements located in the housing structure and extendable into the passageways to pick cotton from the plants.

References Cited in the file of this patent

UNITED STATES PATENTS

| | | |
|---|---|---|
| 2,649,677 | Paradise | Aug. 25, 1953 |
| 2,672,001 | Bopf et al. | Mar. 16, 1954 |
| 2,688,223 | Hagen et al. | Sept. 7, 1954 |